United States Patent
Maleki et al.

(10) Patent No.: US 10,264,238 B2
(45) Date of Patent: Apr. 16, 2019

(54) STEREOSCOPIC MAPPING

(71) Applicant: BitAnimate, Inc., Lake Oswego, OR (US)

(72) Inventors: Behrooz Maleki, West Linn, OR (US); Sarvenaz Sarkhosh, West Linn, OR (US)

(73) Assignee: BITANIMATE, INC., Lake Oswego, OR (US)

( * ) Notice: Subject to any disclaimer, the term of this patent is extended or adjusted under 35 U.S.C. 154(b) by 0 days.

(21) Appl. No.: 15/349,863

(22) Filed: Nov. 11, 2016

(65) Prior Publication Data
US 2017/0142404 A1 May 18, 2017

Related U.S. Application Data

(60) Provisional application No. 62/254,404, filed on Nov. 12, 2015.

(51) Int. Cl.
*G06T 3/00* (2006.01)
*G06T 17/05* (2011.01)
(Continued)

(52) U.S. Cl.
CPC ............ *H04N 13/261* (2018.05); *G06T 3/00* (2013.01); *G06T 17/05* (2013.01);
(Continued)

(58) Field of Classification Search
CPC .......... H04N 13/026; H04N 2013/0081; G06T 3/00; G06T 17/05; G06T 2215/16; G06T 2210/22
See application file for complete search history.

(56) References Cited

U.S. PATENT DOCUMENTS

2004/0005091 A1\* 1/2004 Maruya ................. G06T 7/55
382/154
2005/0270311 A1\* 12/2005 Rasmussen ............ G01C 21/32
345/677
(Continued)

FOREIGN PATENT DOCUMENTS

WO 2015/000060 A1 1/2015
WO WO 2015000060 A1 \* 1/2015 ........... G09B 29/005

OTHER PUBLICATIONS

International Search Report dated Jan. 23, 2017 as received in Application No. PCT/US2016/061721.
(Continued)

*Primary Examiner* — Chan S Park
*Assistant Examiner* — Elisa M Rice
(74) *Attorney, Agent, or Firm* — Maschoff Brennan

(57) ABSTRACT

According to an aspect of an embodiment, a method may include obtaining a first digital image via a mapping application. The method may also include obtaining a second digital image via the mapping application. The method may additionally include determining a displacement factor between the first digital image and the second digital image. Further, the method may include generating a third digital image by cropping the second digital image based on the displacement factor, adjusting an aspect ratio of the third digital image, and resizing the third digital image. Moreover, the method may include generating a stereoscopic map image of the setting that includes a first-eye image and a second eye image. The first-eye image may be based on the first digital image and the second-eye image may be based on the third digital image.

12 Claims, 11 Drawing Sheets

(51) Int. Cl.
*H04N 13/00* (2018.01)
*H04N 13/261* (2018.01)

(52) U.S. Cl.
CPC ...... *G06T 2210/22* (2013.01); *G06T 2215/16* (2013.01); *H04N 2013/0081* (2013.01)

(56) References Cited

U.S. PATENT DOCUMENTS

| | | | | |
|---|---|---|---|---|
| 2008/0024596 A1* | 1/2008 | Li | ............... | H04N 5/2257 348/47 |
| 2010/0306335 A1* | 12/2010 | Rios | ............... | G06T 15/205 709/211 |
| 2011/0141227 A1* | 6/2011 | Bigioi | ............... | H04N 13/0007 348/36 |
| 2011/0141300 A1* | 6/2011 | Stec | ............... | G06T 3/4038 348/222.1 |
| 2012/0293499 A1* | 11/2012 | Lee | ............... | G06T 7/0071 345/419 |
| 2013/0100132 A1* | 4/2013 | Katayama | ............... | H04N 13/0022 345/420 |

OTHER PUBLICATIONS

Written Opinion of the International Searching Authority dated Jan. 23, 2017 as received in Application No. PCT/US2016/061721.

* cited by examiner

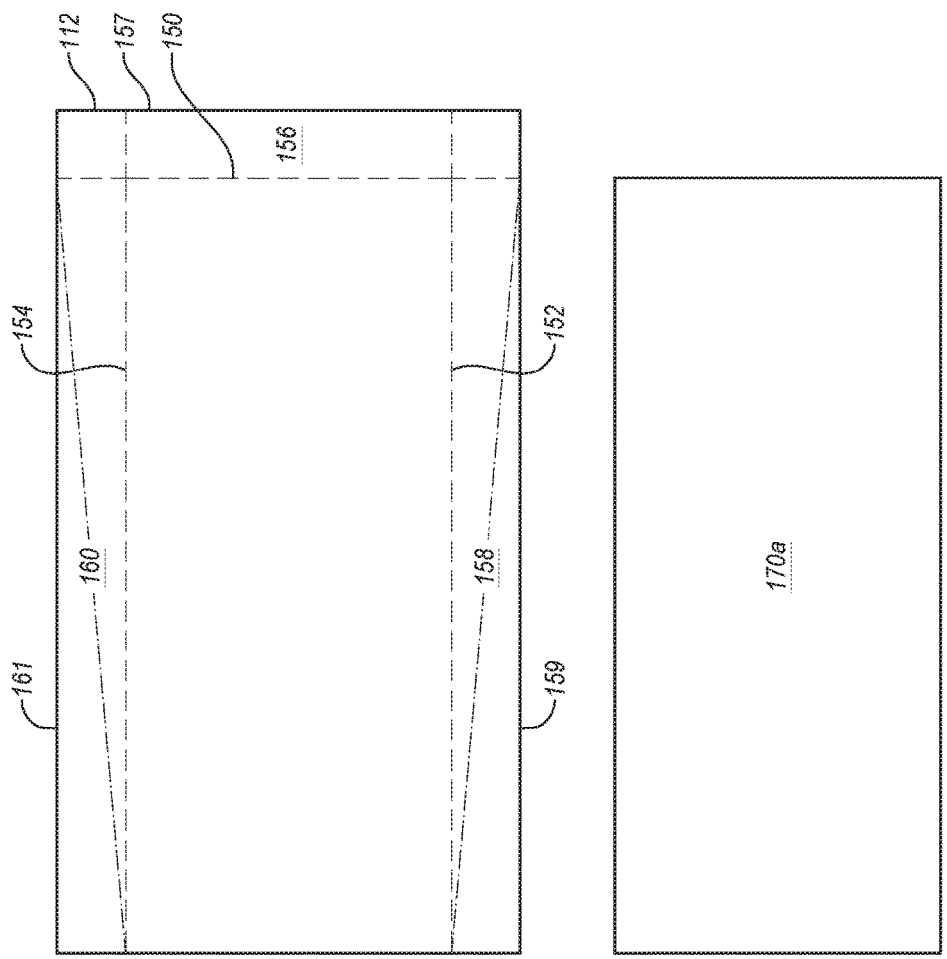

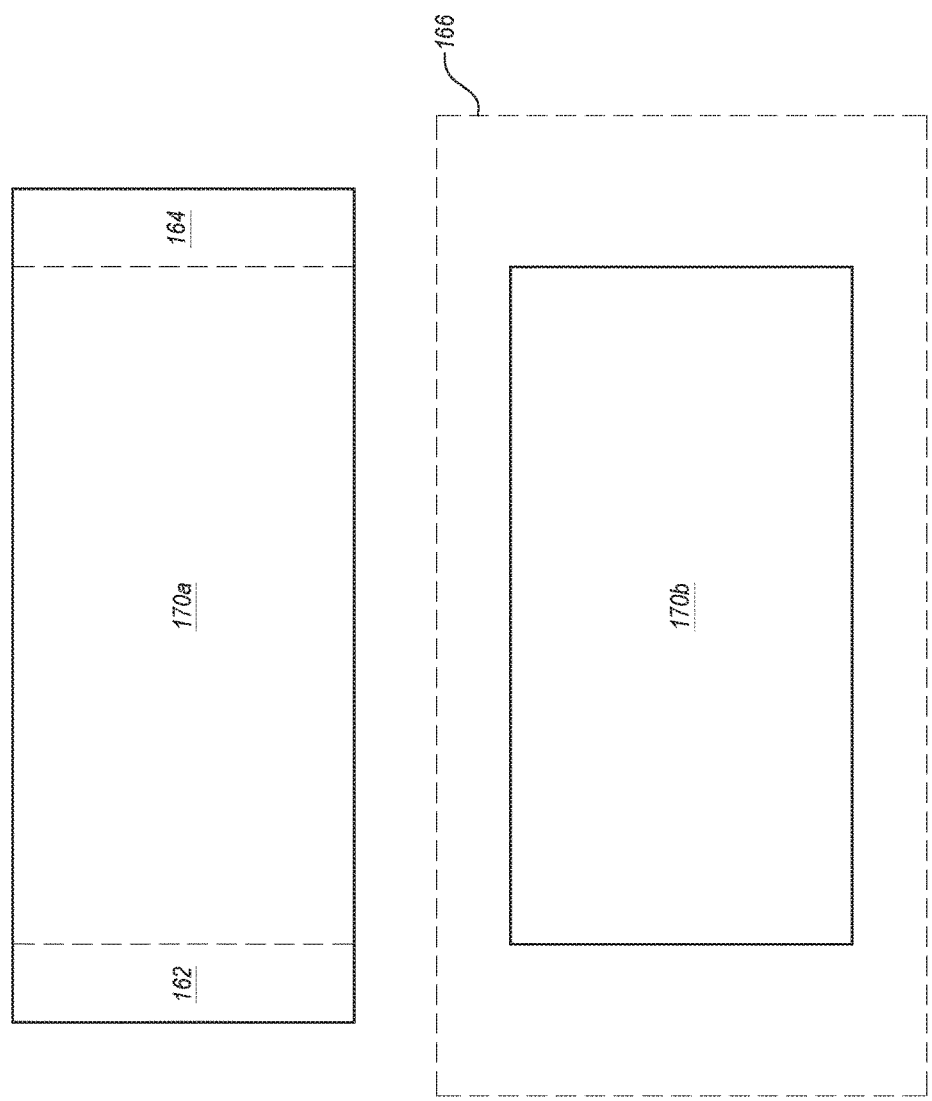

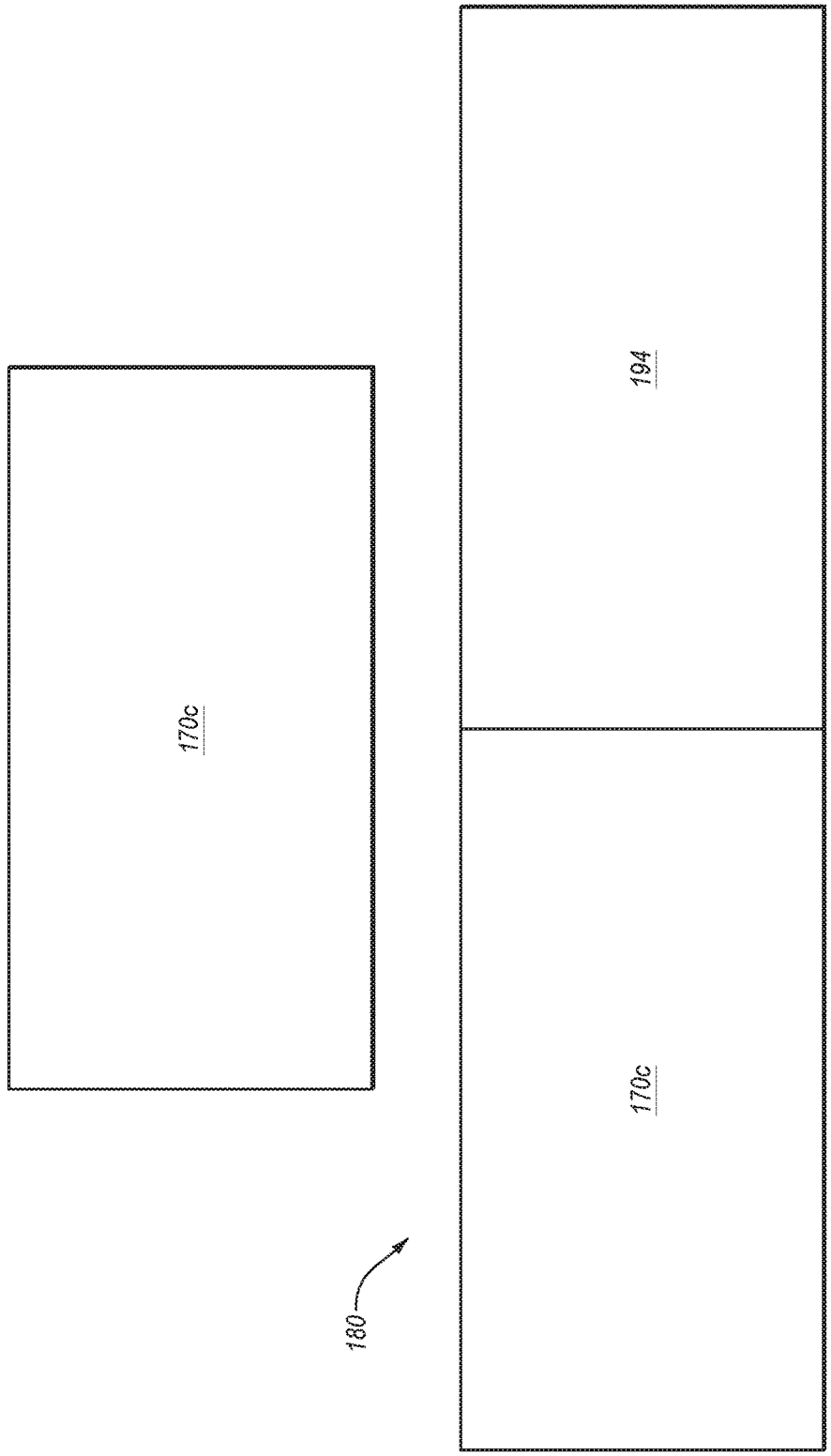

STEREOSCOPIC MAPPING

CROSS-REFERENCE TO RELATED APPLICATIONS

This application is based upon and claims the benefit of priority of U.S. Provisional Application No. 62/254,404, filed on Nov. 12, 2015, the entire contents of which are incorporated herein by reference.

FIELD

The present disclosure relates to rendering stereoscopic images with respect to mapping services.

BRIEF DESCRIPTION OF THE DRAWINGS

Example embodiments will be described and explained with additional specificity and detail through the use of the accompanying drawings in which:

FIG. 1G illustrates an example cropping of a digital image;

FIG. 1H illustrates example adjustment of a digital image; and

FIG. 1I illustrates digital images and a corresponding stereoscopic image;

SUMMARY

Figure 1A:
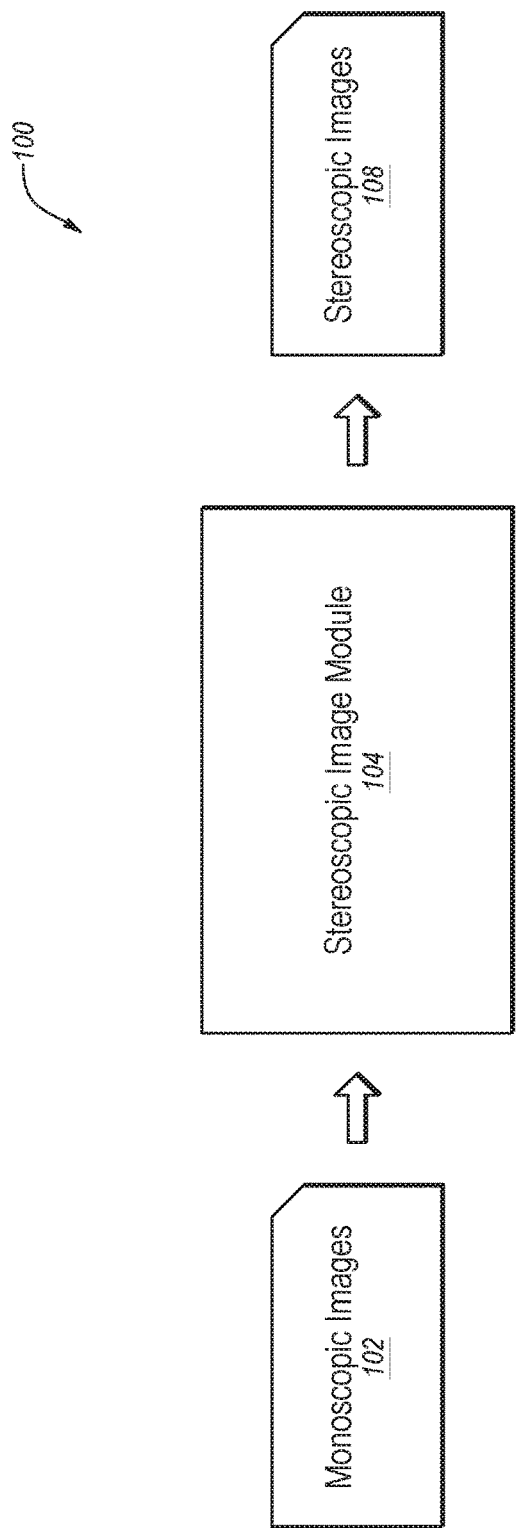
FIG. 1A illustrates an example system 100 for generating stereoscopic (3D) images.

According to an aspect of an embodiment, a method may include obtaining a first digital image via a mapping application. The first digital image may depict a first area of a setting. The method may also include obtaining a second digital image via the mapping application. The second digital image may depict a second area of the setting. The second area and the first area may at least partially overlap each other. The method may additionally include determining a displacement factor between the first digital image and the second digital image. Further, the method may include generating a third digital image by cropping the second digital image based on the displacement factor, adjusting an aspect ratio of the third digital image based on an aspect ratio of the first digital image such that the aspect ratio of the third digital image is substantially the same as the aspect ratio of the first digital image, and resizing the third digital image to have a size substantially the same as a size of the first digital image. Moreover, the method may include generating a stereoscopic map image of the setting that includes a first-eye image and a second eye image. The first-eye image may be based on the first digital image and the second-eye image may be based on the third digital image.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

Description of Embodiments

Many people use digital mapping applications ("mapping applications") to help familiarize themselves with an area or to navigate from one point to another. These mapping applications may be included in or accessible via various devices or navigation systems such as desktop computers, smartphones, tablet computers, automobile navigation systems, Global Positioning System (GPS) navigation devices, etc. In some instances these applications may provide satellite or street-view images of an area. Examples of mapping applications include Google Maps®, Google Earth®, Bing Maps®, etc.

In addition, humans have a binocular vision system that uses two eyes spaced approximately two and a half inches (approximately 6.5 centimeters) apart. Each eye sees the world from a slightly different perspective. The brain uses the difference in these perspectives to calculate or gauge distance. This binocular vision system is partly responsible for the ability to determine with relatively good accuracy the distance of an object. The relative distance of multiple objects in a field-of-view may also be determined with the help of binocular vision.

Three-dimensional (stereoscopic) imaging takes advantage of the depth perceived by binocular vision by presenting two images to a viewer where one image is presented to one eye (e.g., the left eye) and the other image is presented to the other eye (e.g., the right eye). The images presented to the two eyes may include substantially the same elements, but the elements in the two images may be offset from each other to mimic the offsetting perspective that may be perceived by the viewer's eyes in everyday life. Therefore, the viewer may perceive depth in the elements depicted by the images.

According to one or more embodiments of the present disclosure, one or more stereoscopic images may be generated based on monoscopic digital images that may be obtained from a mapping application. The stereoscopic images may each include a first-eye image and a second-eye image that, when viewed using any suitable stereoscopic viewing technique, may result in a user experiencing a three-dimensional effect with respect to the elements included in the stereoscopic images. The monoscopic images may depict a geographic setting of a particular geographic location and the resulting stereoscopic images may provide a three-dimensional (3D) rendering of the geographic setting. The presentation of the stereoscopic images to provide a 3D rendering of geographic settings may help users be better familiarized with the geographic settings depicted by the mapping applications. Reference to a "stereoscopic image" in the present disclosure may refer to any configuration of a first-eye image and a second-eye image that when viewed by their respective eyes may generate a 3D effect as perceived by a viewer.

FIG. 1A illustrates an example system 100 configured to generate stereoscopic (3D) images, according to some embodiments of the present disclosure. The system 100 may include a stereoscopic image generation module 104 (referred to hereinafter as "stereoscopic image module 104") configured to generate one or more stereoscopic images 108. The stereoscopic image module 104 may include any suitable system, apparatus, or device configured to receive monoscopic images 102 and to generate each of the stereoscopic images 108 based on two or more of the monoscopic images 102. For example, in some embodiments, the stereoscopic image module 104 may include software that includes computer-executable instructions configured to cause a processor to perform operations for generating the stereoscopic images 108 based on the monoscopic images 102.

In some embodiments, the monoscopic images 102 may include digital images of a mapping application that depict a geographic setting. For example, the monoscopic images 102 may include satellite or street-view (e.g., such as depicted in the "street view" feature of Google Maps®) digital images that depict a geographic setting. In some embodiments, the stereoscopic image module 104 may be configured to acquire the monoscopic images 102 via the mapping application. For example, in some embodiments, the stereoscopic image module 104 may be configured to access the mapping application via any suitable network such as the Internet to request the monoscopic images 102 from the mapping application. In these or other embodiments, the mapping application and associated monoscopic images 102 may be stored on a same device that may include the stereoscopic image module 104. In these or other embodiments, the stereoscopic image module 104 may be configured to access the mapping application stored on the device to request the monoscopic images 102 from a storage area of the device on which they may be stored.

Additionally or alternatively, the stereoscopic image module 104 may be included with the mapping application in which the stereoscopic image module 104 may obtain the monoscopic images 102 via the mapping application by accessing portions of the mapping application that control obtaining the monoscopic images 102. In other embodiments, the stereoscopic image module 104 may be separate from the mapping application, but may be configured to interface with the mapping application to obtain the monoscopic images 102.

Figure 1B:
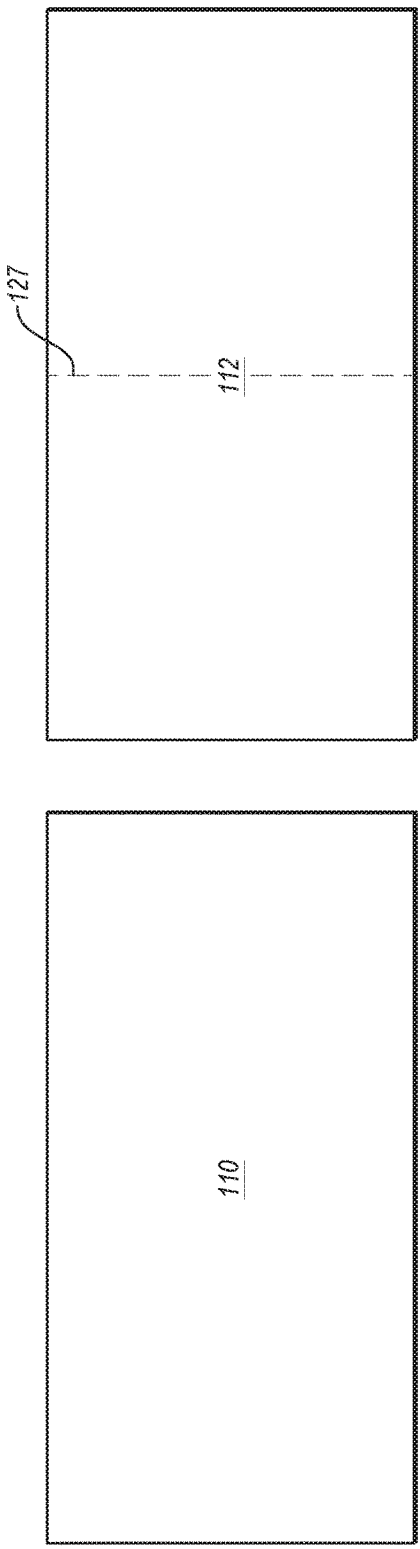
FIG. 1B illustrates example monoscopic digital images that may be used to generate a stereoscopic image.

The stereoscopic image module 104 may be configured to generate the stereoscopic images 108 as indicated below. To aid in explanation of the concepts, the description is given with respect to generation of an example stereoscopic image 180 (illustrated in FIG. 1I and described below), which may be an example of one of the stereoscopic images 108 of FIG. 1A. Further, the description is given with respect to generation of the stereoscopic image 180 based on an example first digital image 110 and an example second digital image 112, which are illustrated in FIG. 1B. The first digital image 110 and the second digital image 112 are examples of monoscopic images that may be included with the monoscopic images 102 of FIG. 1A.

In some embodiments, the first digital image 110 may depict a first area of a geographic setting based on one or more properties of a camera that may capture the first digital image 110. For example, the first area may be based on a position of the corresponding camera, a field-of-view of the camera, a zooming factor of the camera, etc. Additionally, the second digital image 112 may depict a second area 113 (illustrated in FIG. 1F and discussed in further detail below) of the geographic setting based on one or more properties of a camera that may capture the second digital image. For example, the second area 113 may be based on a position of the corresponding camera, a field-of-view of the camera, a zooming factor of the camera, etc. Further, in some embodiments, the first digital image 110 and the second digital image 112 may be substantially the same size and may have substantially the same aspect ratio in which they may both include the same number of or approximately the same number of pixels in both the horizontal and vertical directions.

Figure 1C:
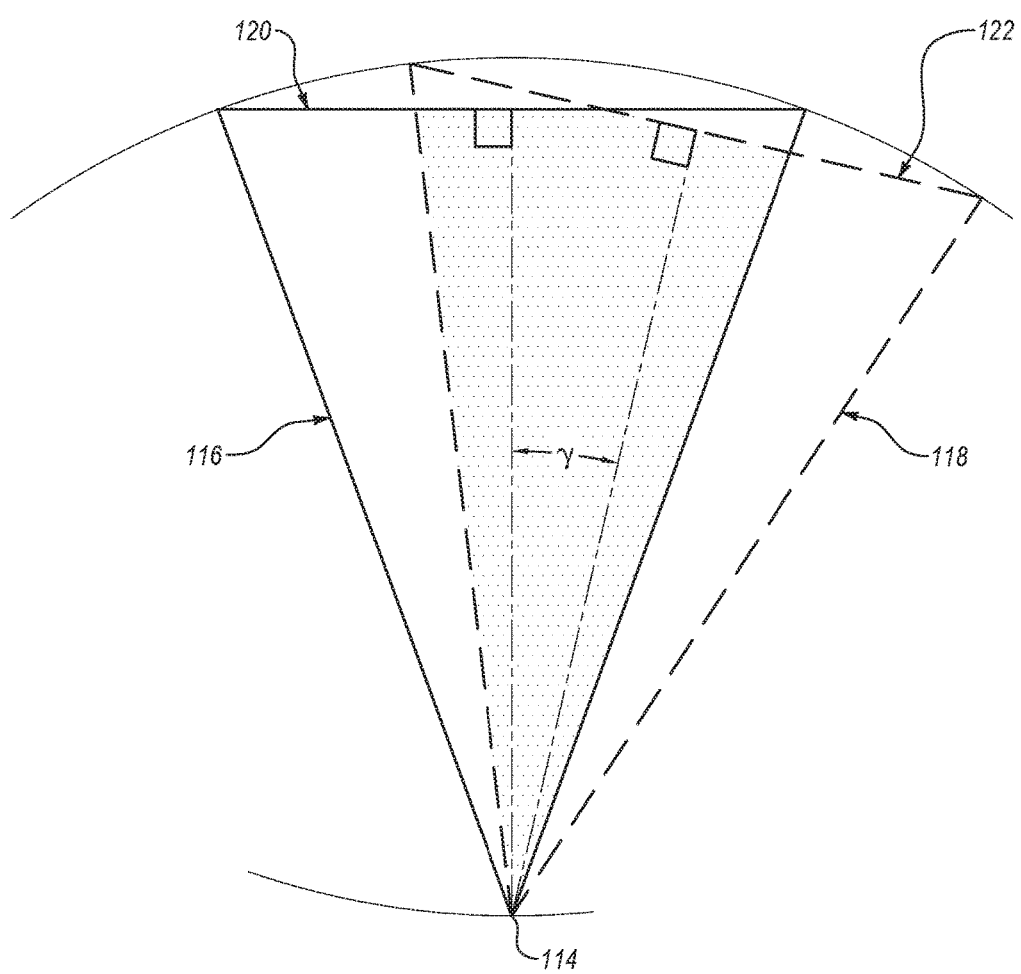
FIG. 1C illustrates example fields-of-view and a position of a camera with respect to the digital images of FIG. 1B.

In some embodiments, the first digital image 110 and the second digital image 112 may each be captured by a camera 114 depicted in FIG. 1C. Additionally or alternatively, a first position of the camera 114 while capturing the first digital image 110 and a second position of the camera 114 while capturing the second digital image 112 may be such that the first area and the second area 113 may have a lateral offset with respect to each other. In the present disclosure, reference to a lateral offset between digital images (e.g., between the first digital image 110 and the second digital image 112) may refer to the lateral offset between areas and associated elements that may be depicted in the digital images. Further, reference to lateral offset may refer to differences in pixel locations of elements that are in both the respective digital images. In some embodiments, the first and second positions may be such that the second area 113 may overlap with at least a portion of the first area. In addition, lateral offset may be an example displacement factor that may indicate differences between digital images (e.g., between the first digital image 110 and the second digital image 112). Additionally or alternatively, the first and second positions of the camera 114 may correspond to rotational positions of the camera 114 about an axis.

For example, FIG. 1C illustrates example fields of view and positioning of the camera 114 with respect to the first digital image 110 and the second digital image 112. In particular, FIG. 1C illustrates an example top-view of a first field-of-view 116 (depicted by the large triangle with solid lines) of the camera 114 with the camera 114 at the first position associated with the first digital image 110. FIG. 1C also illustrates an example top-view of a second field-of-view 118 (depicted by the large triangle with dashed lines) of the camera 114 with the camera 114 at the second position associated with the second digital image 112. In the illustrated example, the camera 114 may have been rotated along a vertical axis (protruding out of the page) to move the camera 114 from the first position to the second position.

The amount of rotation between the first position and the second position may be represented by an offset angle "γ," as illustrated in FIG. 1C. In some embodiments, the offset angle "γ" may be an example of a displacement factor between the first digital image 110 and the second digital image 112. For example, movement of the camera 114 from the first position to the second position may create a lateral offset between the first digital image 110 and the second digital image 112. The amount of lateral offset between the first digital image 110 and the second digital image 112 may depend on the value of the offset angle "γ." The offset angle "γ" may also thus be a displacement factor between the first digital image 110 and the second digital image 112.

Additionally or alternatively, the offset angle "γ" may indicate a change in perspective between the first digital image 110 and the second digital image 112 that may create differences between the first digital image 110 and the second digital image 112 other than a lateral offset. For example, a line 120 of FIG. 1C may indicate a first perspective orientation with respect to the first digital image 110. Similarly, a line 122 of FIG. 1C may indicate a second perspective orientation with respect to the first digital image 110. As indicated by FIG. 1C, the line 120 and the line 122 may intersect each other at the offset angle "γ." The value of the offset angle "γ" may affect a difference in perspective of the first digital image 110 and the second digital image 112. The offset angle "γ" between the line 120 and the line 122 may thus be a displacement factor with respect to differences between the first digital image 110 and the second digital image 112.

In some embodiments, the stereoscopic image module 104 may be configured to obtain, via the mapping application, the first digital image 110 of the monoscopic images 102. The stereoscopic image module 104 may also be configured to obtain, via the mapping application, the second digital image 112 of the monoscopic images 102.

In some embodiments, the stereoscopic image module 104 may be configured to determine a target displacement factor between the first digital image 110 and the second digital image 112. In some embodiments, the target displacement factor may include a target lateral offset between the first digital image 110 and the second digital image 112. Additionally or alternatively, the target displacement factor may include an offset angle between the first digital image 110 and the second digital image 112, such as the offset angle "γ" of FIG. 1C described above. The target displacement factor may be determined based on a target degree of 3D effect that may be rendered by the stereoscopic image 180 that may be generated based on the first digital image 110 and the second digital image 112.

For example, as described in further detail below, the stereoscopic image 180 may be based on the first digital image 110 and a third digital image 170c (described in further detail below). As indicated below, in some embodiments, the stereoscopic image 180 may include a modified first digital image 194 (described in further detail below) that may be generated based on the first digital image 110. Further, the stereoscopic image 180 may include the third digital image 170c which may be obtained by modifying the second digital image 112 as described in detail below. The 3D effect that may be generated by the stereoscopic image 180 may be related to the lateral offset of elements within the first digital image 110 and the third digital image. Additionally, the lateral offset of elements within the first digital image 110 and the third digital image 170c may be related to the lateral offset of elements between the first digital image 110 and the second digital image 112. As such, in some embodiments, a target lateral offset may be determined as a target displacement factor based on a target 3D effect. Additionally or alternatively, as indicated above, the amount of lateral offset between the first digital image 110 and the second digital image 112, may be based on an offset angle (e.g., the offset angle "γ"). As such, a target offset angle may be determined as a target displacement factor based on the target 3D effect and the target lateral offset in some embodiments.

In some embodiments, the stereoscopic image module 104 may be configured to obtain the second digital image 112 by requesting a digital image based on the target displacement factor. For example, the stereoscopic image module 104 may be configured to determine a target lateral offset and may be configured to obtain first coordinates that correspond to the first digital image 110. The stereoscopic image module 104 may be configured to apply the determined target lateral offset to the first coordinates to determine second coordinates. The stereoscopic image module 104 may be configured to request a digital image that corresponds to the second coordinates and may be configured to use such digital image as the second digital image 112.

As indicated above, in some embodiments, the second digital image 112 may be modified to generate the third digital image 170c. The third digital image 170c may be generated such that the third digital image 170c may provide a perspective that imitates a view of the geographic setting depicted in the first digital image 110 and the second digital image 112 as if the first area depicted by the first digital image 110 were viewed by one eye and as if a third area depicted by the third digital image 170c were viewed by another eye. As detailed further below, in some embodiments, the first digital image 110 may also be modified to help produce the stereoscopic effect.

Figure 1D:
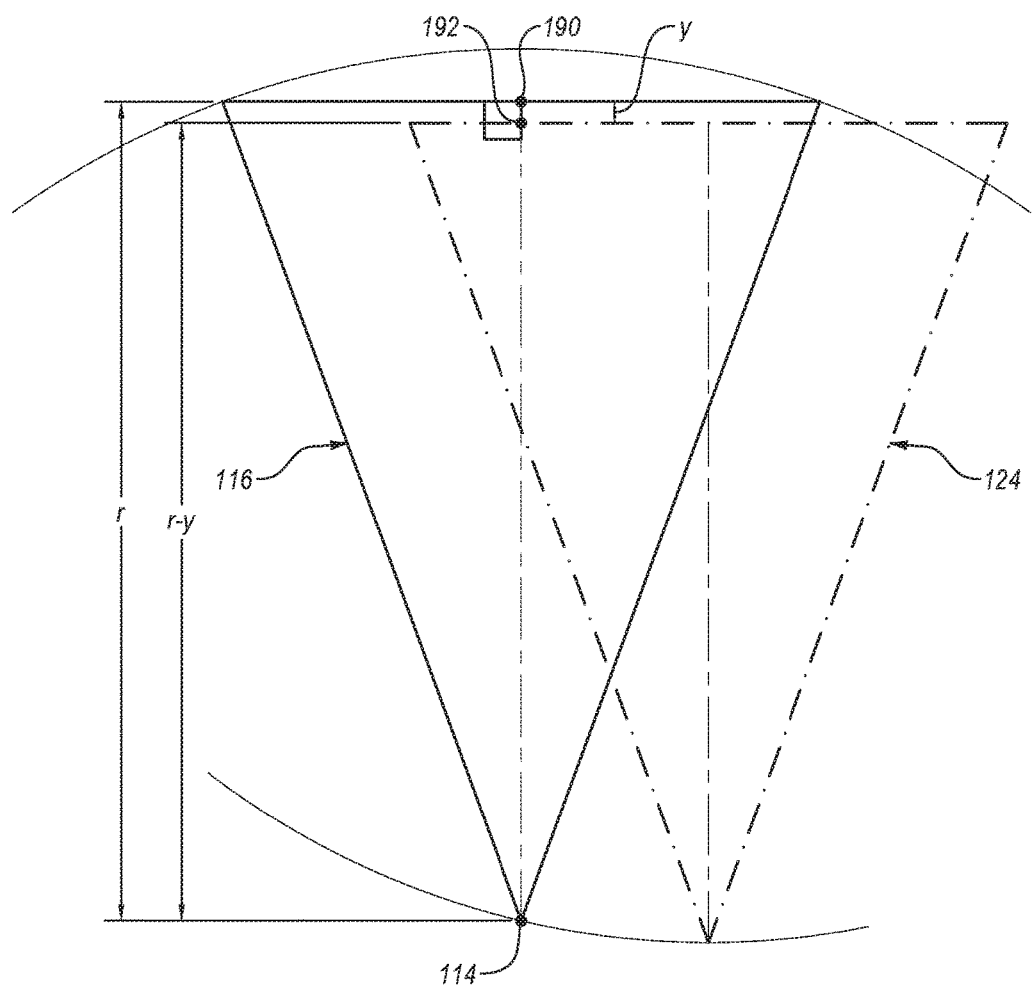
FIG. 1D illustrates example fields-of-view.

For example, FIG. 1D illustrates the first field-of-view 116 with an example third field-of-view 124. The third field-of-view 124 may represent an example perspective of the geographic setting that may correspond to the third digital image 170c. As illustrated in FIG. 1D, the first field-of-view 118 and the third field-of-view 124 may be parallel to or substantially parallel to each other to mimic the relationship between the fields of view of two different eyes. However, as also illustrated in FIG. 1D, in some instances the depth of the focal point of the first field-of-view 118 in the geographic setting and the depth of the focal point of third field-of-view 124 in the geographic setting may differ. As detailed below, in some embodiments, the first digital image 110 may be modified to at least partially compensate for the focal point depth difference.

Figure 1E:
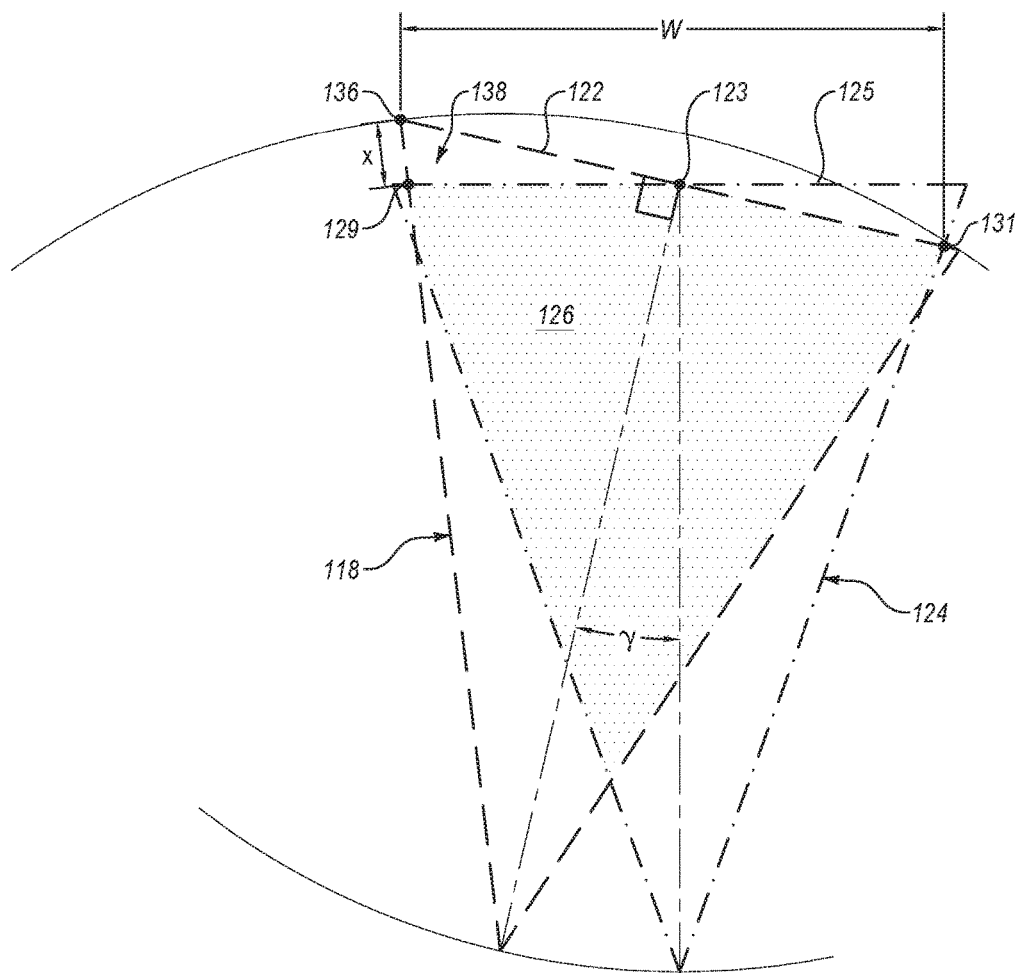
FIG. 1E illustrates example fields-of-view.

In some embodiments, the position of the third field-of-view 124 may be based on the second field-of-view 118. Additionally or alternatively, the position of the third field-of-view 124 may be based on the offset angle "γ." For example, as illustrated in FIG. 1E, the second field-of-view 118 may include a center point 123 along the line 122. The center point 123 may correspond to a center line 127 of the second digital image 112 (illustrated in FIG. 1B). The position of third field-of-view 124 may be obtained by rotating the second field-of-view 118 about the center point 123. Additionally or alternatively, in some embodiments, the second field-of-view 118 may be rotated about the center point 123 by the offset angle "γ" to obtain the position of third field-of-view 124.

In these or other embodiments, the direction of the rotation of the second field-of-view 118 to obtain the position of the third field-of-view 124 may be based on the direction of rotation of the camera 114 of FIG. 1C with respect to the first digital image 110 and the second digital image 112. For instance, in the illustrated example of FIG. 1C, the second digital image 112 may correspond to a rotation to the right of the camera 114 by the offset angle "γ." The direction of rotation about the center point 123 of the second field-of-view 118 to obtain the position of the third field-of-view 124 may thus also be to the right by the offset angle "γ."

In some embodiments, the displacement factor may be such that the second field-of-view 118 and the third field-of-view 124 may overlap. For example, in the illustrated example, the offset angle "γ" may be such that the second field-of-view 118 and the third field-of-view 124 may overlap within an overlapping field-of-view 126 (depicted by the shaded area in FIG. 1E). Further, the amount of overlap may be based on the value of the offset angle "γ." The overlapping of the second field-of-view 118 with the third field-of-view 124 may indicate an overlapping area where the second area 113 depicted by the second digital image 112 may overlap with a third area. The third area may correspond to a portion of the geographic setting that may be depicted by a digital image captured by the camera 114 of FIG. 1C if the camera 114 were positioned to have the third field-of-view 124.

Figure 1F:
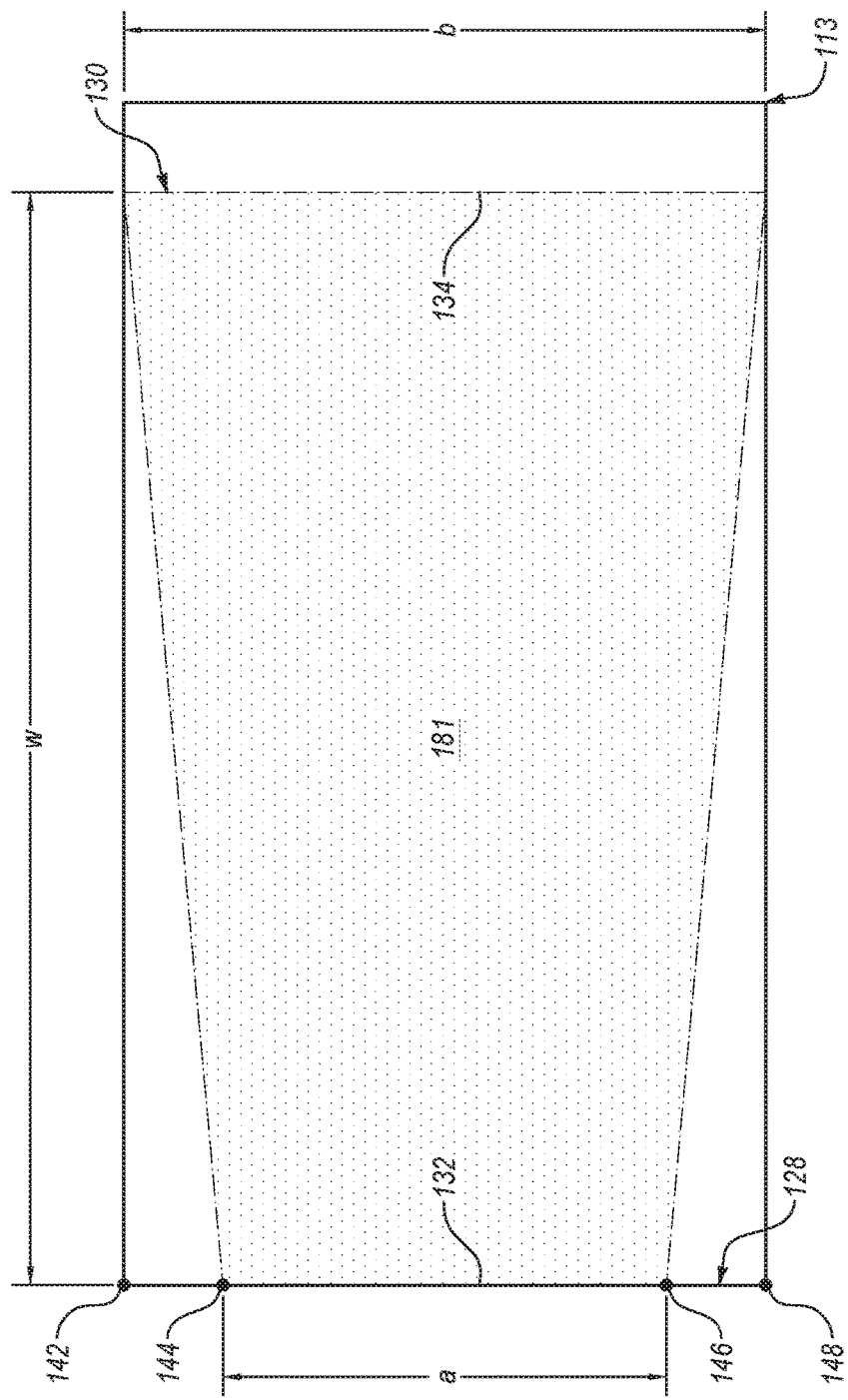
FIG. 1F illustrates an example area that may be depicted by a digital image associated with the camera of FIG. 1C being positioned as indicated in FIG. 1C.

For example, FIG. 1F includes an example of the second area 113 that may be depicted by the second digital image 112. FIG. 1F also illustrates an example of a sub-area 181 with respect to the second area 113. The sub-area 181 may be the portion of the third area that may be included in the second area 113. As such, the sub-area 181 may represent the overlapping area between the second area 113 and the third area. The size and shape of the overlapping area and the corresponding sub-area 181 may be based on the displacement factor discussed above.

For example, as illustrated in FIG. 1F, the sub-area 181 may have a lateral length "w" that may indicate a distance between an overlapping edge 128 and an overlapping edge 130. The overlapping edges 128 and 130 may correspond to edges of the second area 113 and of the third area that may define the lateral width of the sub-area 181. Additionally, points 129 and 131 of FIG. 1E may correspond to the overlapping edges 128 and 130, respectively. As such, a lateral distance between points 129 and 131 may also have the lateral length "w" as indicated in FIG. 1E. The distance indicated by the lateral length "w" may include an actual distance in the associated geographic setting between the overlapping edges 128 and 130. Additionally or alternatively, the distance indicated by the lateral length "w" may include a number of pixels of the second digital image 112 between the overlapping edges 128 and 130.

In some embodiments, the lateral length "w" may vary according to a lateral offset between the first digital image 110 and the second digital image 112 in which the lateral length "w" may be bigger for smaller lateral offsets and may be smaller for larger lateral offsets. For example, as indicated above, the lateral offset may be based on the value of the offset angle "γ" (as indicated in FIG. 1C) and the amount of the overlapping field-of-view 126 of FIG. 1E may be based on the offset angle "γ." As indicated in FIG. 1E, the lateral length "w" may be based on the amount of the overlapping field-of-view 126 such that the lateral length "w" may also be based on the value of the offset angle "γ."

Additionally, as illustrated in FIG. 1F, the sub-area 181 may have a trapezoidal shape with a first side 132 and a second side 134. In the illustrated example, the first side 132 may have a vertical length "a" and the second side 134 may have a vertical length "b" where the vertical length "a" may be smaller than the vertical length "b." The vertical length "b" may be the same as or approximately the same as a length associated with the overlapping edge 130. In some embodiments, the length of the overlapping edge 130 may be the same as or approximately the same as the width of the second area 113. The difference between "a" and "b" may be expressed as follows "a=b−x" where "x" is a length of a short side 136 of a small triangle 138 illustrated in FIG. 1E.

Further, half of the length "x" may indicate a distance between a point 144 and a point 142 along the overlapping edge 128 and the other half of the length "x" may indicate a distance between a point 146 and a point 148 along the overlapping edge 128. In addition, according to geometric principles, the value of "x" may be based on the value of the offset angle "γ" such that the trapezoidal shape of the sub-area 181 may also be based on the value of the offset angle "γ." Therefore, the trapezoidal shape of the sub-area 181 may be based on a displacement factor that includes the offset angle "γ" or the lateral offset.

The lengths indicated by the vertical lengths "a" and "b" may include an actual distance in the associated geographic setting. Additionally or alternatively, the distances indicated by the vertical lengths "a" and "b" may include a number of pixels of the second digital image 112.

In some embodiments, the stereoscopic image module 104 may be configured to determine the sub-area 181 described above with respect to FIG. 1F. For example, the based on geometric principles, pixel information, and/or distance information that may be obtained with respect to the first digital image 110 and the second digital image 112, the stereoscopic image module 104 may be configured to determine the dimensions (e.g., the lateral length "w," vertical length "a," vertical length "b," length "x," etc.) of the sub-area 181.

For example, the distance information may include distances between the camera 114 and the focal points of the first digital image 110 and the second digital image 112, coordinate information associated with the first digital image 110 and the second digital image 112, lateral distances of the geographic setting depicted by the first digital image 110 and the second digital image 112, etc. Such distance information may be used to determine the lateral offset between the first digital image 110 and the second digital image 112 as well as the offset angle "γ" in some instances. The distance information associated with the second digital image 112 in conjunction with the offset angle "γ" and the principles described above with respect to the third field-of-view 124 of FIG. 1E and the sub-area 181 of FIG. 1F may be used to determine the dimensions of the sub-area 181. In some embodiments, the distance information may be included with metadata of the first digital image 110 and the second digital image 112 that may be accessed by the stereoscopic image module 104.

Additionally or alternatively, the pixel information may include pixel locations and information regarding elements that are represented by the pixels. The pixel information may also be included in metadata that may be part of the first digital image 110 and the second digital image 112. In some embodiments, the pixel information may be used to determine distance information.

The stereoscopic image module 104 may be configured to generate the third digital image 170c based on the sub-area 181 and the second digital image 112. In particular, the stereoscopic image module 104 may be configured to crop the second digital image 112 based on the sub-area 181. For example, FIG. 1G illustrates a cropping that may be performed with respect to the second digital image 112 based on the sub-area 181. In particular, the stereoscopic image module 104 may be configured to crop the second digital image 112 along a first crop line 150, a second crop line 152, and a third crop line 154.

In some embodiments, the stereoscopic image module 104 may be configured to determine which pixels of the second digital image 112 correspond to the overlapping edge 130 based on the locations of the pixels in the second digital image 112 that correspond to the edge elements of the overlapping edge 130. The stereoscopic image module 104 may be configured to treat such pixels as the first crop line 150 and may crop out a portion 156 of the second digital image 112 between the first crop line 150 and an edge 157 of the second digital image 112 accordingly.

Additionally or alternatively, the stereoscopic image module 104 may be configured to determine a vertical location of one or more pixels of the second digital image 112 that may correspond to the point 146 of FIG. 1F. The location of the point 146 may be determined based on geometric principles and the information described above. The stereoscopic image module 104 may be configured to treat pixels of the second digital image 112 that have substantially the same vertical location of the pixels that correspond to the point 146 as the second crop line 152. The stereoscopic image module 104 may be configured to crop out a portion 158 of the second digital image 112 between the second crop line 152 and an edge 159 of the second digital image 112 accordingly.

In these or other embodiments, the stereoscopic image module 104 may be configured to determine a vertical location of one or more pixels of the second digital image 112 that may correspond to the point 144 of FIG. 1F, whose location may be determined based on geometric principles and the information described above. The stereoscopic image module 104 may be configured to treat pixels of the second digital image 112 that have substantially the same vertical location of the pixels that correspond to the point 144 as the third crop line 154. The stereoscopic image module 104 may be configured to crop out a portion 160 of the second digital image 112 between the third crop line 154 and an edge 161 of the second digital image 112 accordingly.

The cropping of the second digital image 112 as described above may produce a third digital image 170a. The third digital image 170a may thus be based on the second digital image 112 and the sub-area 181.

The stereoscopic image module 104 may be configured to adjust an aspect ratio of the third digital image 170a in some embodiments. For example, due to the cropping of the second digital image 112 to generate the third digital image 170a, the aspect ratio of the third digital image 170a may be different from that of the second digital image 112 and from that of the first digital image 110 in instances in which the first digital image 110 and the second digital image 112 have the same size and aspect ratio. In some embodiments, the stereoscopic image module 104 may be configured to modify the aspect ratio of the third digital image 170a such that it may be substantially the same as the aspect ratio of the first digital image 110.

By way of example, referring to FIG. 1H, the aspect ratio of the third digital image 170a may be larger (i.e., the horizontal to vertical ratio of pixels may be larger) than the aspect ratio of the first digital image 110. The stereoscopic image module 104 may be configured to accordingly crop out portions 162 and 164 of the third digital image 170a such that the aspect ratio of the third digital image 170a may be the same as or approximately the same as the aspect ratio of the first digital image 110. Additionally, in some embodiments, the sizes of the portions 162 and 164 may be equal or approximately equal to each other such that half of the cropping may be performed with respect to the left of the third digital image 170a and the other half of the cropping may be performed with respect to the right of the third digital image 170a. In some embodiments, the aspect ratio based cropping of the third digital image 170a may produce a third digital image 170b.

Additionally or alternatively, the stereoscopic image module 104 may be configured to adjust a size (e.g., number of pixels) of the third digital image 170b in some embodiments. For example, due to the cropping of the second digital image 112 to generate the third digital image 170a and the aspect ratio cropping of the third digital image 170a to generate the third digital image 170b, the size of the third digital image 170b may be different from that of the second digital image 112 and from that of the first digital image 110 in instances in which the first digital image 110 and the second digital image 112 have the same size or approximately the same size. For example, the dashed box 166 of FIG. 1H may represent a size of the first digital image 110 and the second digital image 112 and a size of the box that corresponds to the third digital image 170b may represent a size of the third digital image 170b.

In some embodiments, the stereoscopic image module 104 may be configured to modify the size of the third digital image 170b such that it may be substantially the same as the size of the first digital image 110. For example, the stereoscopic image module 104 may be configured to increase the size (e.g., increase the number of pixels) of the third digital image 170b to generate a third digital image 170c (illustrated in FIG. 1I). Additionally or alternatively, the stereoscopic image module 104 may be configured to maintain the aspect ratio while increasing the size such that the aspect ratio of the third digital image 170c may be the same as or approximately the same as the aspect ratio of the third digital image 170b. In particular, the stereoscopic image module 104 may be configured to increase the number of pixels in the third digital image 170b to generate the third digital image 170c such that the third digital image 170c includes approximately the same number or the same number of pixels as the first digital image 110. Additionally, the number of pixel rows and pixel columns that may be added may be such that the third digital image 170c may have the same or approximately the same aspect ratio as the aspect ratio of the third digital image 170c and of the first digital image 110. The stereoscopic image module 104 may be configured to increase the size of the third digital image 170b to generate the third digital image 170c using any appropriate technique.

As indicated above, the third digital image 170c may depict the geographic setting as if the camera 114 of FIG. 1C were positioned to have the third field-of-view 124 of FIGS. 1D and 1E. Further, as also indicated above with respect to FIG. 1D, the depth associated with the focal point of first digital image 110 may be different than the depth associated with the focal point of the third digital image 170c. Accordingly, in some embodiments, the first digital image 110 may be modified to adjust for the focal point depth differences.

For example, in some embodiments, a depth difference "y" illustrated in FIG. 1D may be determined based on: the distance information associated with the first digital image 110 and the second digital image 112; the relationship between the first field-of-view 116 and the second field-of-view 118 as described above; the relationship between the second field-of-view 118 and the third field-of-view 124 as described above; and geometric principles known in the art. Further, the first digital image 110 may be modified to generate a modified first digital image 194 (depicted in FIG. 1K) based on the depth difference "y." For example, the first digital image 110 may have a focal point at a point 190 that may have a distance of "r" from the camera 114. The first digital image 110 may be modified (e.g., based on the distance information associated with the first digital image 110) such that the focal point is moved from the point 190 to a point 192 in the modified first digital image 194. The point 192 may have a distance of "r-y" from the camera 114.

In some embodiments, the first digital image 110 may be modified into the modified first digital image 194 by requesting another image from the mapping application with a focal point at the point 192 and a distance of "r" from the camera 114. In these or other embodiments, the first digital image 110 may be cropped and resized based on the focal point being at the point 192 and a distance of "r" from the camera to obtain the modified first digital image 194. In these or other embodiments, the resizing may include obtaining information from the mapping application that may have been lost in the cropping.

As described above, elements in the first digital image 110 (and thus in the modified first digital image 194) may be offset from elements in the third digital image 170c based on the third digital image 170c being generated from the second digital image 112 and based on the second digital image 112 having a lateral offset with respect to the first digital image 110. Therefore, in some embodiments, the stereoscopic image module 104 may be configured to generate the stereoscopic image 180 in FIG. 1I to include the third digital image 170c and the modified first digital image 194. In particular, the modified first digital image 190 may be used as a first-eye image of the stereoscopic image 180 and the third digital image 170c may be used as a second-eye image of the stereoscopic image 180.

Returning to FIG. 1A, the stereoscopic image module 104 may be configured to generate any number of stereoscopic images 108 based on any number of monoscopic images 102 using the principles describe above. Additionally, as indicated above, because the monoscopic images 102 and the stereoscopic images 108 may be images of a setting (e.g., street-view or satellite images), the stereoscopic images 108 may be stereoscopic map images that may be rendered with respect to the setting. Additionally or alternatively, in some embodiments, the stereoscopic image module 104 may be configured to generate a series of stereoscopic images 108 that may correspond to a navigation route such that the navigation route may be rendered in 3D.

In these or other embodiments, the stereoscopic image module 104 may be configured to interface with a display module of a device such that the stereoscopic images 108 may be presented on a corresponding display to render the 3D effect. The stereoscopic image module 104 may be configured to present the stereoscopic images 108 according to the particular requirements of the corresponding display and display module.

Therefore, the stereoscopic image module 104 may be configured to generate stereoscopic mapping images based on monoscopic mapping images as described above. Modifications, additions, or omissions may be made to FIGS. 1A-1I without departing from the scope of the present disclosure. For example, the relationships between elements depicted may not be to scale and are for illustrative purposes only. In particular, the amount of cropping that may be performed, the angles illustrated, the size and shape of the overlapping area, etc., are merely to illustrate the principles described and are not limiting. Additionally, although various operations are described in a particular order, one or more of the operations may be performed in a differing order than described or at the same time. Further, the aspect ratio cropping described above is an example of cropping off left and right portions of a digital image to obtain a target aspect ratio. In some instances, the cropping may crop off top and bottom portions instead to obtain the target aspect ratio.

Figure 2:
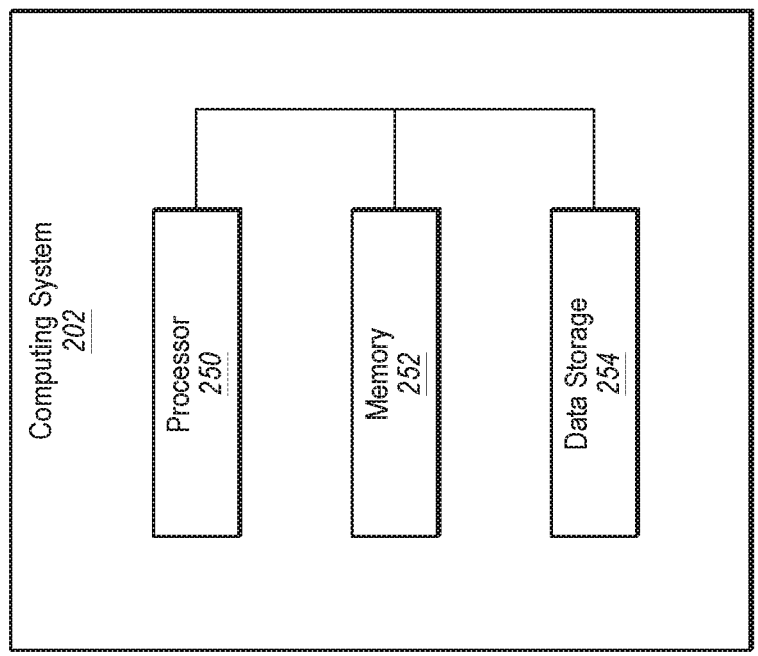
FIG. 2 illustrates an example computing system.

FIG. 2 illustrates a block diagram of an example computing system 202, according to at least one embodiment of the present disclosure. The computing system 202 may be configured to implement one or more operations associated with a sim module (e.g., the stereoscopic image module 104). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the sim module may be included in the data storage 254 as program instructions. The processor 250 may fetch the program instructions of the sim module from the data storage 254 and may load the program instructions of the sim module in the memory 252. After the program instructions of the sim module are loaded into memory 252, the processor 250 may execute the program instructions such that the computing system may implement the operations associated with the sim module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

Figure 3:
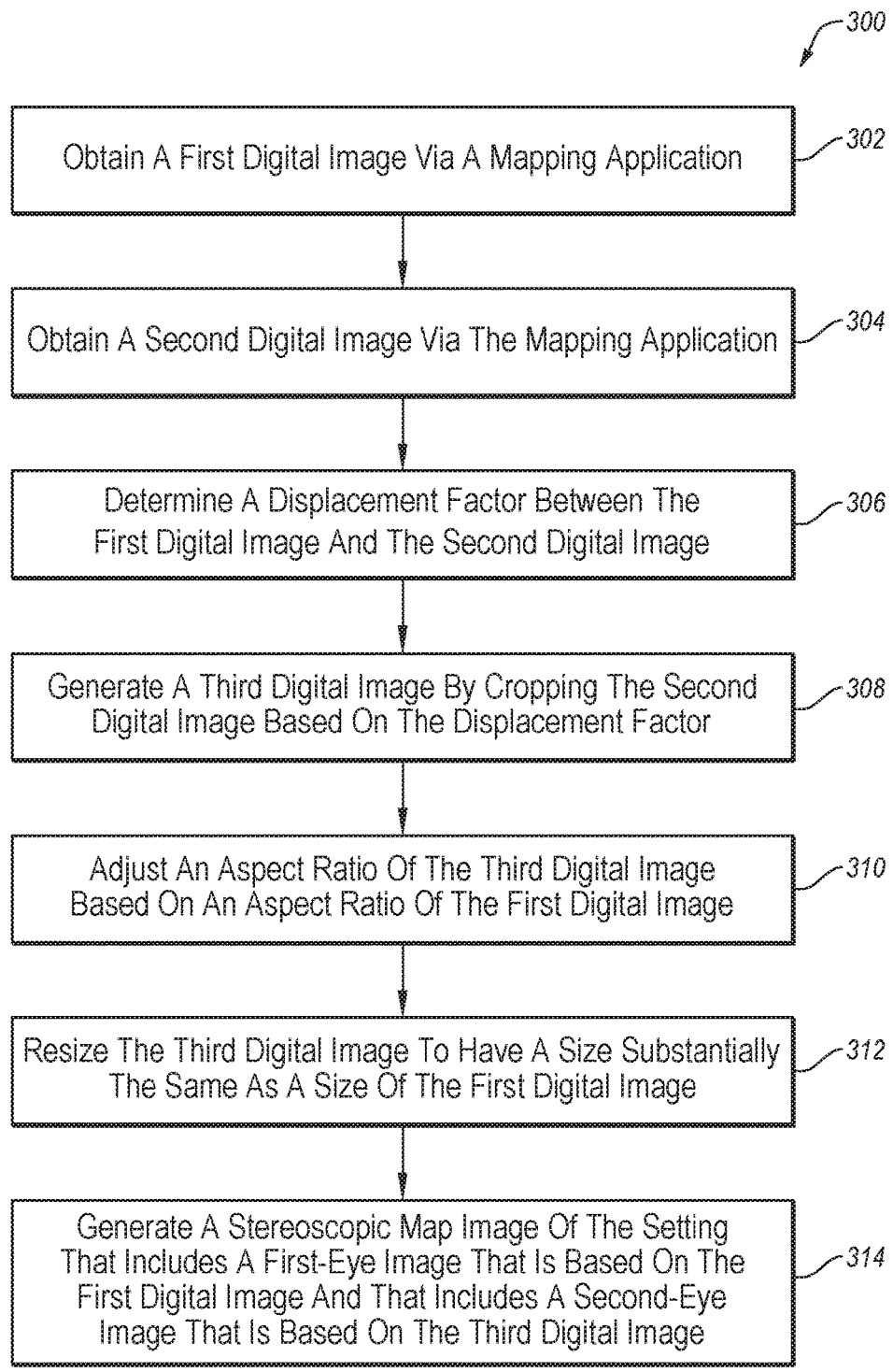
FIG. 3 is a flow-chart of an example computer-implemented method of generating stereoscopic images, all arranged in accordance with at least some embodiments described in the present disclosure.

FIG. 3 is a flow-chart of an example computer-implemented method 300 of generating stereoscopic images, according to one or more embodiments of the present disclosure. One or more operations of the method 300 may be implemented, in some embodiments, by the stereoscopic image module 104 of FIG. 1. In these or other embodiments, one or more operations of the method 300 may be implemented by one or more components of a system that may include a stereoscopic image module, such as the computing system 202 of FIG. 2. Although illustrated as discrete blocks, various blocks may be divided into additional blocks, combined into fewer blocks, or eliminated, depending on the desired implementation.

The method 300 may begin at block 302 where a first digital image may be obtained. The first digital image may depict a first area of a setting. The first digital image 110 described above is an example of the first digital image that may be obtained. Further, in some embodiments, the first digital image may be obtained in any manner such as described above with respect to obtaining the first digital image 110.

At block 304 a second digital image may be obtained based on the first digital image and based on a target offset. The second digital image may depict a second area of the setting that may be offset from the first area by the target offset. In some embodiments, the target offset may be based on a target degree of a stereoscopic effect such as described above. The second digital image 112 described above is an example of the second digital image that may be obtained. Further, in some embodiments, the second digital image may be obtained in any manner such as described above with respect to obtaining the second digital image 112.

At block 306, a displacement factor between the first digital image and the second digital image may be obtained. In some embodiments, the displacement factor may include an offset angle such as the offset angle "γ" described above. In some embodiments, the displacement factor may be based on and determined with respect to the target offset. In these and other embodiments, the displacement factor may be the target offset and may be determined as the target offset from which the second digital image may be obtained in block 304. As such, in some embodiments, at least some of the operations of block 306 may be performed before the obtaining of the second digital image with respect to block 304.

At block 308, a third digital image may be generated based on the displacement factor and the second digital image. For example, the third digital image may be obtained by cropping the second digital image based on a determined sub-area of the second area that may be based on the offset angle such as described above with respect to generation of the third digital image 170a as illustrated in FIGS. 1C-1G.

At block 310, an aspect ratio of the third digital image generated at block 308 may be adjusted. In some embodiments, the aspect ratio may be adjusted based on an aspect ratio of the first digital image such that the aspect ratio of the third digital image is approximately equal to that of the first digital image. For example, in some embodiments, the aspect ratio may be adjusted such as described above with respect to FIG. 1H.

At block 312, the third digital image may be resized. In some embodiments, the third digital image may be resized according to a size of the first digital image. For example, the third digital image may be resized such that it has the same or approximately the same size as the first digital image. In some embodiments, the resizing may be performed such as described above with respect to FIGS. 1H and 1I.

At block 314, a stereoscopic map image of the setting may be generated. The stereoscopic may image may include a first-eye image and a second-eye image. The first eye-image may be generated based on the first digital image. For example, in some embodiments, the first digital image may be modified based on a focal point of the third digital image to generate a modified first digital image. In these or other examples, the modified first digital image may be used as the first-eye image. Additionally or alternatively, the third digital image may be used as the second-eye image.

Therefore, the method 300 may be used to generate a stereoscopic image according to one or more embodiments of the present disclosure. Modifications, additions, or omissions may be made to the method 300 without departing from the scope of the present disclosure. For example, the functions and/or operations described with respect to FIG. 3 may be implemented in differing order without departing from the scope of the present disclosure. Furthermore, the outlined functions and operations are only provided as examples, and some of the functions and operations may be optional, combined into fewer functions and operations, or expanded into additional functions and operations without detracting from the essence of the disclosed embodiments.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a first digital image via a mapping application, the first digital image depicting a first area of a setting;
   determining a target offset angle with respect to a change in perspective from the first digital image that occurs in response to rotation of a camera that captures the first digital image, the target offset angle being determined based on a target degree of stereoscopic effect;
   obtaining a second digital image via the mapping application in which the second digital image is obtained based on the second digital image having the target offset angle with respect to the first digital image, the second digital image depicting a second area of the setting, the second area and the first area at least partially overlapping each other;
   generating a third digital image by cropping the second digital image based on the target offset angle;
   adjusting an aspect ratio of the third digital image based on an aspect ratio of the first digital image such that the aspect ratio of the third digital image is substantially the same as the aspect ratio of the first digital image;
   resizing the third digital image to have a size substantially the same as a size of the first digital image;
   generating a stereoscopic map image of the setting that includes a first-eye image that is based on the first digital image and that includes a second-eye image that is based on the third digital image; and
   mapping and presenting a navigation route that includes the setting in which the stereoscopic map image is presented with respect to the setting.

2. The method of claim 1, wherein the first digital image and the second digital image each include street-view images of the setting.

3. The method of claim 1, wherein the first digital image and the second digital image each include satellite images of the setting.

4. The method of claim 1, further comprising:
   determining an overlapping area between the second area and a third area of the setting, the third area being based on a rotation of a field-of-view associated with the second digital image about a center of the second digital image according to the target offset angle; and
   cropping the second digital image based on the overlapping area to generate the third digital image.

5. The method of claim 1, further comprising:
   modifying the first digital image to change the first area and produce a modified first digital image; and
   using the modified first digital image as the first-eye image.

6. The method of claim 5, further comprising modifying the first digital image based on a focal point of the third digital image.

7. Non-transitory computer-readable storage media including computer executable instructions configured to cause a system to perform operations, the operations comprising:
   obtaining a first digital image via a mapping application, the first digital image depicting a first area of a setting;
   determining a target offset angle with respect to a change in perspective from the first digital image that occurs in response to rotation of a camera that captures the first digital image, the target offset angle being determined based on a target degree of stereoscopic effect;
   obtaining a second digital image via the mapping application in which the second digital image is obtained based on the second digital image having the target offset angle with respect to the first digital image, the second digital image depicting a second area of the setting, the second area and the first area at least partially overlapping each other;
   generating a third digital image by cropping the second digital image based on the target offset angle;
   adjusting an aspect ratio of the third digital image based on an aspect ratio of the first digital image such that the aspect ratio of the third digital image is substantially the same as the aspect ratio of the first digital image;
   resizing the third digital image to have a size substantially the same as a size of the first digital image;
   generating a stereoscopic map image of the setting that includes a first-eye image that is based on the first digital image and that includes a second-eye image that is based on the third digital image; and
   mapping and presenting a navigation route that includes the setting in which the stereoscopic map image is presented with respect to the setting.

8. The non-transitory computer-readable storage media of claim 7, wherein the first digital image and the second digital image each include street-view images of the setting.

9. The non-transitory computer-readable storage media of claim 7, wherein the first digital image and the second digital image each include satellite images of the setting.

10. The non-transitory computer-readable storage media of claim 7, wherein the operations further comprise:
    determining an overlapping area between the second area and a third area of the setting, the third area being based on a rotation of a field-of-view associated with the second digital image about a center of the second digital image according to the target offset angle; and cropping the second digital image based on the overlapping area to generate the third digital image.

11. The non-transitory computer-readable storage media of claim 7, wherein the operations further comprise:

modifying the first digital image to change the first area and produce a modified first digital image; and using the modified first digital image as the first-eye image.

12. The non-transitory computer-readable storage media of claim 11, wherein the operations further comprise modifying the first digital image based on a focal point of the third digital image.

* * * * *